(12) United States Patent
Patel

(10) Patent No.: US 7,474,612 B1
(45) Date of Patent: Jan. 6, 2009

(54) MULTI-FUNCTION BYPASS PORT AND PORT BYPASS CIRCUIT

(75) Inventor: Bijit T. Patel, Breinigsville, PA (US)

(73) Assignee: PMC- Sierra, Inc., Santa Clara, CA (US)

( * ) Notice: Subject to any disclaimer, the term of this patent is extended or adjusted under 35 U.S.C. 154(b) by 1073 days.

(21) Appl. No.: 10/805,441

(22) Filed: Mar. 22, 2004

Related U.S. Application Data

(60) Provisional application No. 60/455,871, filed on Mar. 20, 2003.

(51) Int. Cl.
*H04J 1/16* (2006.01)
*H04J 3/06* (2006.01)

(52) U.S. Cl. .................. 370/217; 370/221; 370/503
(58) Field of Classification Search ............ 370/217, 370/503
See application file for complete search history.

(56) References Cited

U.S. PATENT DOCUMENTS

| | | | |
|---|---|---|---|
| 5,636,248 A | 6/1997 | Tash et al. | |
| 6,631,144 B1 * | 10/2003 | Johansen | 370/516 |
| 6,650,141 B2 * | 11/2003 | Agrawal et al. | 326/41 |
| 6,861,868 B1 * | 3/2005 | Agrawal et al. | 326/38 |
| 7,099,278 B2 * | 8/2006 | Momtaz | 370/249 |
| 2001/0016929 A1 * | 8/2001 | Bonneau et al. | 714/735 |
| 2002/0105386 A1 | 8/2002 | Shastri | |
| 2003/0101020 A1 * | 5/2003 | Matsushige | 702/185 |
| 2003/0117945 A1 * | 6/2003 | Zboril | 370/216 |
| 2003/0179771 A1 * | 9/2003 | Chan et al. | 370/445 |
| 2004/0081196 A1 * | 4/2004 | Elliott | 370/465 |
| 2004/0136411 A1 * | 7/2004 | Hornbuckle et al. | 370/537 |
| 2004/0236906 A1 * | 11/2004 | Matsushige et al. | 711/113 |
| 2005/0129057 A1 * | 6/2005 | Chen et al. | 370/462 |

OTHER PUBLICATIONS

AMCC Data Sheet, "Six Port Bypass and Repeator For FC-AL", Feb. 9, 2000 / Revision D, pp. 1-13.
Vitesse Data Sheet, VSC7147 and VSC7147-01—Hex PBC With Dual Repeater/Retimer'.
Maxim Data Sheet, "2.125 Gbps, 3.3V Quad-Port Bypass with Repeater", pp. 1-13.
Agilent Data Sheet, "Agilent HDMP-0552 Quad Port Bypass Circuit with CDR and Data Valid Detection For Fibre Channel Arbitrated Loops" pp. 1-12.

* cited by examiner

*Primary Examiner*—Andrew Lee

(57) ABSTRACT

An architecture is provided for implementing bypass, repeater and retimer functions in high-speed multi-port SER-DES bypass ports and devices. Specifically, this architecture uses clock recovery to implement a repeater function which retransmits data synchronously at a recovered-clock rate, providing very low-latency as no elastic-buffers are required to perform clock-rate compensation. It also supports a full retiming function where incoming data is retransmitted synchronously to the local-clock domain, in which case elastic-buffers are needed to compensate for differences between incoming clock and local-clock domains. The architecture disclosed herein is advantageously used for Fibre-Channel Arbitrated Loop (FCAL) applications. It can also be leveraged in other applications like Infiniband, XAUI, PCI-Express to create a single device that be used as "eye-opener" to extend reach with low-latency when operated in "repeater mode" and as retiming device when operated as "retimer-mode". It can also perform as an amplifier with very low-latency when operated in bypass-mode.

22 Claims, 13 Drawing Sheets

MULTI-FUNCTION BYPASS PORT AND PORT BYPASS CIRCUIT

CROSS REFERENCE TO RELATED APPLICATIONS

The present application claims the benefit of priority of U.S. Patent Application Ser. No. 60/455,871, filed on Mar. 20, 2003, which is incorporated herein by reference.

FIELD OF THE INVENTION

The present invention relates generally to high speed serial interfaces. More particularly, the present invention relates to multiport serialization and deserialization devices, such as port bypass circuits having bypass ports.

BACKGROUND OF THE INVENTION

High-speed serial interfaces are increasingly being used as a back-plane interconnect between chips in communications, storage and enterprise, systems. High-speed serial interfaces incorporate serialization, deserialization and clock-data recovery functions and are generally refereed to as "SERDES" devices. To increase throughput and reduce the number of pins, a recent trend is to incorporate multiple SERDES ports in a single device. Power, area and performance are three key parameters that need to be optimized to achieve integration of multiple SERDES ports in a single device.

SERDES devices operate either as synchronous or plesiochronous systems. In synchronous systems, both the transmit and receive devices operate at the same exact clock frequency. Therefore, in synchronous systems no clock-rate compensation is required since both transmitting and receiving devices operate from the same exact reference clock frequency. In plesiochronous systems, transmit and receive devices each have their own separate local reference clocks which are close to each other in frequency, but have a very small offset in the order of ±100 ppm. An elastic-buffer is required to handle these small clock rate differences. Elastic-buffers insert/delete idles into the incoming data stream such that this data when retransmitted out does not cause overflow or underflow problems at the receiving device.

Clock Data Recovery is a technique for embedding clock and data into a single signal for the sake of transmission. High-speed serial data require the clocks to be embedded into the data stream to remove skew and jitter issues associated with transmitting this information separately from data. Jitter generally refers to a random variation in the timing of a signal, especially a clock. For clock jitter, there are two main parameters: period jitter and cycle to cycle jitter. Period jitter consists of peak to peak period jitter and root mean square (RMS) period jitter. The peak to peak period jitter is the difference between the maximum and minimum period of the clock signal. The RMS period jitter is the standard deviation of the peak to peak period jitter. Cycle to cycle jitter is the variation from one period to the next adjacent period of the signal. In order to determine the variation between adjacent periods, all consecutive periods need to be measured. The peak to peak period jitter is the worst case of cycle to cycle jitter.

Clock Data Recovery (CDR) is used on a receive-side to extract "incoming-clock" and data from a serial data stream. Serial data is first deserialized and then transferred to a "local-clock" domain with the use of elastic-buffers. Deserialized data can be transmitted out again with very low-jitter synchronous to local-clock. This operation is typically referred to as "retimer mode". A "retimer" function attenuates all jitter at the input and outputs data with extremely low-jitter. However, the retimer function results in very high-latency due to elastic-buffers.

Fibre-Channel Arbitrated Loop (FCAL) is a fast serial bus interface standard intended to replace SCSI on high-end servers. Some applications, such as FCAL, require data regeneration to reduce or eliminate jitter due to channel inter-symbol interference (ISI). This requires that data be retransmitted synchronous to the incoming-clock. Incoming-clock is also referred as "recovered-clock". The function of retransmitting data synchronous to the recovered-clock is termed as "repeater mode". A "repeater" function does not require any elastic-buffers as there is no rate difference between incoming and outgoing data, but use is still made of CDR to extract incoming clock and data from a serial data stream. The repeater function results in very low-latency as no elastic-buffers are required.

Multi-port SERDES devices are usually implemented as either "retimer" or "repeater" devices, and ports are either all configured as repeater, or all configured as retimer. In these devices, an analog PLL (phase-locked loop) is typically used to perform the CDR function on each port. However, analog PLLs require a large area and consume more power than other port devices. These area and power limitations restrict the number of SERDES ports that can be integrated on a single device. Having all ports operate as either "repeater" or "retimer" limits the use of these devices.

In FCAL applications, disks are connected together using a simple loop topology. Data flows in a daisy-chain fashion from one disk to another. To prevent a single disk failure from making the loop non-operational, a port bypass circuit (PBC) is used. PBC provides a capability to bypass a non-working disk and still maintain a complete loop.

FIG. 1 illustrates an example of a port 10 in a PBC device as implemented in conventional products. Under typical conditions where all adjacent disks are operational, data from a first disk 12 is sent as RX data 14 to the input of a multiplexer, or mux, 16. Data is then output from the multiplexer 16 as TX data 18 to a second disk 20. In the case where the first disk 12 has failed, incoming data is received from the previous disk via input Bypass_IN 22 into the multiplexer 16. In the case where the second disk 20 has failed, the output from the multiplexer 16 is sent via the output Bypass_Out 24 to the next disk. The simple multiplexer 16 retransmits data with minimum latency in a synchronous manner. However, the simple mux does not attenuate any jitter introduced due to band-width limited channel from the disk to PBC since no retiming is performed. Moreover, at high data rates channel imperfections and ISI due to limited channel bandwidth degrade the signal integrity of the link significantly.

FIG. 2 shows a multiport SERDES device including PBC devices as implemented in conventional products using simple ports. In the situation of the multiport SERDES device 50 shown in FIG. 2, there are four operational disks indicated in bold outline, and five non-operational disks that are each bypassed, as indicated by the bypassed disks having a line through them. Most ports 52 implement a circuit as shown in FIG. 1 for enabling the bypass function. A path followed by data is indicated in bold lines, with the data bypassing the non-operational disks and proceeding to operational disks. CDR is typically implemented only on one port of the PBC 50 for jitter attenuation. Many known products use an analog PLL for CDR function. However, analog PLL-based CDRs are costly in terms of area, power and have limited frequency range. Therefore, due to power and area constrains, only few ports have CDRs with capability to attenuate incoming jitter and improve signal integrity.

As shown in FIG. 2, only the port with CDR has capability to attenuate jitter. Ports without CDR may not be able to meet input deterministic jitter (DJ) link-budget for the disk under worst-case bypass path since data is not retimed. Generally, CDR is placed at the input of the loop to attenuate jitter, as indicated by CDR 54 shown in bold lines. CDR can alternatively be placed at the output of the loop, as indicated by CDR 56 shown in dashed lines. In any case, CDR typically exists only at the transmit or receive end of the PBC, but not both. Since known devices have only a single CDR, this places a limitation on FCAL loop topology due to the need in FCAL to reduce or eliminate jitter.

In some recent approaches, a digital clock-recovery method has been used instead of the traditional analog PLL method described above. The basic idea in these more recent approaches is to use a single PLL to generate multiple clock-phases that are closely spaced together. It then uses a simple "phase-picking" algorithm to perform clock-data recovery. This approach is also referred to as digital-clock-data recovery (DCDR) since mostly digital logic is used to select an optimal clock-phase for clock-recovery. In DCDR a single PLL can be shared across multiple channels. Sharing a single-PLL across multiple channels results in very small area and power for the device, since this area and power can be amortized across multiple channels.

The use of DCDR can provide some relief to the area and power drawbacks of known approaches, which permits CDR to be implemented on more than one port in a SERDES device. However, each of these ports, while supporting bypass functionality, is still restricted to operation in either repeater or retimer mode. Therefore, if there are any changes with respect to a customer's needs with respect to system-jitter budget, latency and performance, these changing needs cannot be accommodated by the existing solutions, which are aimed at optimizing some of those performance characteristics, to the detriment of the other characteristics.

It is therefore desirable to provide a port that is configurable to provide bypass, repeater and retimer functions, and where multiple such ports can be provided in a SERDES device, or port bypass circuit.

SUMMARY OF THE INVENTION

It is an object of the present invention to obviate or mitigate at least one disadvantage of previous bypass port and port bypass circuit architectures.

Embodiments of the present invention provide a multi-port SERDES architecture with very low-power and area where each port is a multi-function port that can support bypass, repeater and retimer modes. Such an architecture is advantageously used for Fibre-Channel Arbitrated Loop (FCAL) applications. Having all three modes on each port enables customers to make a trade-off between system-jitter budget, latency and performance. Having CDR on each port also enables one to use simple digital pre-distortion filters on the transmit path to compensate for channel losses. Performing pre-distortion on a transmit side is relatively easier since the transmitter has a history of data patterns sent. Some embodiments also provide capability to monitor data that is being bypassed, and others are flexible to support multiple FCAL loops with a single device.

In a first aspect, the present invention provides a bypass port. The bypass port includes an input multiplexer for receiving an input from a current port input or a bypass input. It also includes a clock and data recovery (CDR) unit for receiving a data stream from the input multiplexer, and for extracting a recovered clock from the data stream. A retimer circuit is coupled to the CDR unit and is for communication with an elastic buffer for retiming data to a local clock. A retransmit multiplexer is coupled to the CDR unit for retransmitting data synchronous to the recovered clock in response to data received from the CDR unit. The retransmit multiplexer is also coupled to the retimer circuit for retransmitting data synchronous to the local clock in response to data received from the retimer circuit. An output multiplexer is coupled to the input multiplexer for performing a bypass function in response to data received from the input multiplexer. The output multiplexer is also coupled to the retransmit multiplexer for outputting data in response to data received from the retransmit multiplexer. The output multiplexer is for outputting data to a current port output or a bypass output.

The bypass port can further include a repeater select multiplexer for monitoring a bypassed disk and for operating a disk adjacent to the monitored bypassed disk in a repeater-bypass mode. The repeater select multiplexer can be in communication with a CDR unit of a previous port and coupled to the retransmit multiplexer, for performing a repeater function in response to data received from the CDR unit of the previous port and for outputting a result to the retransmit multiplexer. The repeater select multiplexer can also be coupled to the CDR unit and in communication with a retransmit multiplexer of a next port, for performing a repeater function in response to data received from the CDR unit and for outputting a result to the retransmit multiplexer of the next port.

The bypass port can further include a digital pre-distortion filter, in communication with the CDR unit and with the retimer multiplexer, for compensating for at least one of channel inter-symbol interference and distortion. The CDR unit can include a digital CDR circuit. The CDR unit can include a digital phase locked loop (PLL) shared across a plurality of bypass ports. The CDR unit can perform clock and data recovery based on a phase-picking algorithm, or based on a phase-interpolation algorithm.

The retimer circuit can includes a serial in parallel out (SIPO) shift register for providing information to the elastic buffer. It can also include a parallel in serial out (PISO) shift register for receiving information from the elastic buffer. The retimer circuit can further include digital logic for use in a monitoring mode. The digital logic can be for receiving data from the SIPO and for monitoring the data received, and can also be for sending monitoring data to the PISO for further transmission to an output of the output multiplexer.

In a second aspect, the present invention also provides a bypass port. In this aspect, the bypass port includes an input multiplexer for receiving an input from a current port input or a bypass input. It also includes a monitoring circuit for monitoring a bypassed disk, such as based on recovered data related to the bypassed disk, the monitoring circuit being coupled to the input multiplexer. The monitoring circuit includes: a clock and data recovery (CDR) unit for receiving a data stream from the input multiplexer; a serial in parallel out (SIPO) shift register coupled to the CDR unit; and digital logic for receiving data from the SIPO and for monitoring the data received.

The monitoring circuit can include a retransmit multiplexer coupled to the monitoring circuit for retransmitting data received from the monitoring circuit. It can also include an output multiplexer coupled to the input multiplexer and to the monitoring circuit for performing a bypass function in response to data received from the input multiplexer, and for outputting data in response to data received from the monitoring circuit, the output multiplexer for outputting data to a current port output or a bypass output. The monitoring circuit can further include a parallel in serial out (PISO) shift register for passing data from the digital logic to an output of the output multiplexer.

In a further aspect, the present invention provides a port bypass circuit for connection to a plurality of disks, the port bypass circuit having a plurality of bypass ports. Each of the bypass ports includes: an input multiplexer for receiving an input from a current port input or a bypass input; a clock and data recovery (CDR) unit for receiving a data stream from the input multiplexer, and for extracting a recovered clock from the data stream; a retimer circuit coupled to the CDR unit for retiming data to a local clock; a retransmit multiplexer coupled to the CDR unit for retransmitting data synchronous to the recovered clock in response to data received from the CDR unit, and coupled to the retimer circuit for retransmitting data synchronous to the local clock in response to data received from the retimer circuit; and an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output.

The plurality of bypass ports can include every port of the port bypass circuit. The plurality of bypass ports can be arranged to permit connection of the plurality of disks together in a simple loop topology.

In a yet further aspect, the present invention provides a port bypass circuit for connection to a plurality of disks. The port bypass circuit includes a plurality of bypass ports, each of the bypass ports including an input multiplexer for receiving an input from a current port input or a bypass input; The port bypass circuit also includes a digital clock and data recovery (CDR) circuit shared across the plurality of bypass ports for receiving a data stream from the input multiplexer associated with each of the bypass ports and for extracting a recovered clock from the data stream. Each of the bypass ports further includes: a retimer circuit coupled to the digital CDR circuit for retiming data to a local clock; a retransmit multiplexer coupled to the digital CDR circuit for retransmitting data synchronous to the recovered clock in response to data received from the digital CDR circuit, and coupled to the retimer circuit for retransmitting data synchronous to a local clock in response to data received from the retimer circuit; and an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output. The digital CDR circuit can include a digital phase locked loop (PLL).

In a still further aspect, the present invention provides a port bypass method. The port bypass method includes the following steps: receiving an input data stream from a current port or a previous port; extracting a recovered clock from the data stream; retiming data to a local clock; retransmitting data synchronous to the recovered clock in response to a repeater condition; retransmitting data synchronous to the local clock in response to a retimer condition; performing a bypass function in response to a bypass condition; and outputting data in response to data received from the retransmit multiplexer, the outputting being to a current port or a subsequent port.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
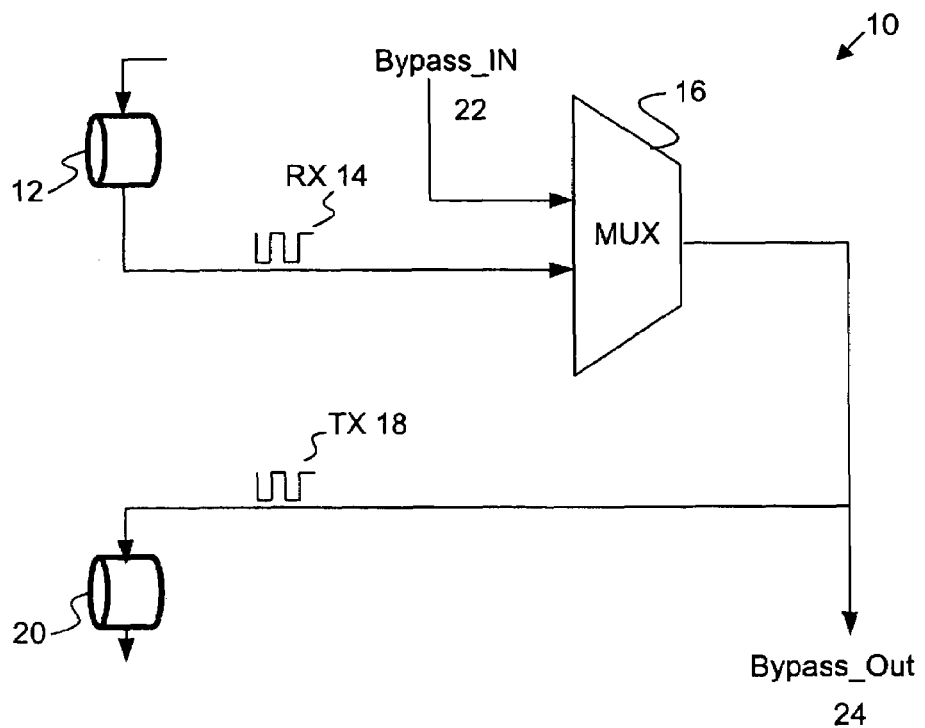
FIG. 1 is an example of a known bypass port.
Figure 2:
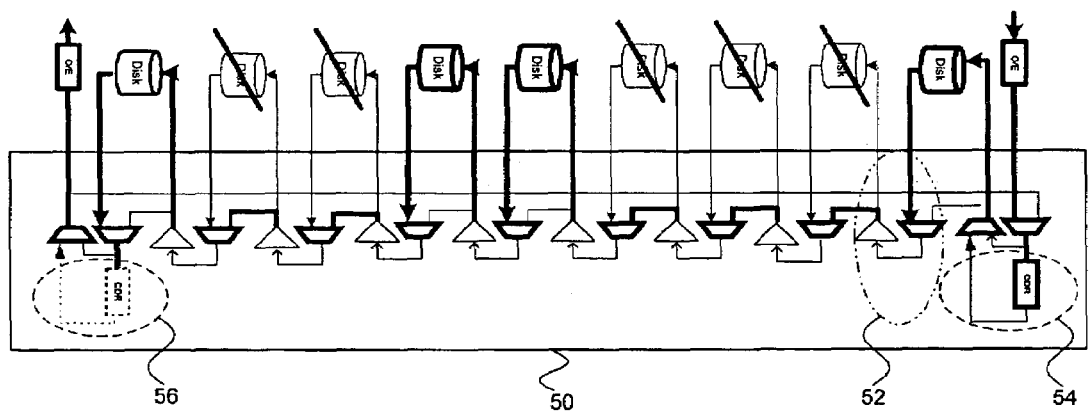
FIG. 2 is a known port bypass circuit (PBC)

Generally, the present invention provides an architecture for implementing bypass, repeater and retimer functions in high-speed multi-port SERDES bypass ports and devices. Specifically, this architecture uses clockrecovery to implement a repeater function which retransmits data synchronously at a recovered-clock rate, providing very low-latency as no elastic-buffers are required to perform clock-rate compensation. It also supports a full retiming function where incoming data is retransmitted synchronously to the local-clock domain, in which case elastic-buffers are needed to compensate for differences between incoming clock and local-clock domains. The architecture disclosed herein is advantageously used for Fibre-Channel Arbitrated Loop (FCAL) applications. It can also be leveraged in other applications like Infiniband, XAUI, PCI-Express to create a single device that be used as "eye-opener" to extend reach with low-latency when operated in "repeater mode" and as retiming device when operated as "retimer-mode". It can also perform as an amplifier with very low-latency when operated in bypass-mode.

Embodiments of the present invention are applicable to any high-speed multi-port SERDES application in which the capability to provide bypass, repeater and retimer modes on each port, thus using very small area and low power, is desired. Specifically, it is advantageously used with FCAL applications to create devices that allow a trade-off between latency and signal-integrity. It can also be used to create a single device that can operate as a jitter-attenuator on a per channel-basis or a device that can provide trunking capability to align multiple channels to a local-clock domain for XAUI (XSBI, or 10 Gigabit, Attachment Unit Interface) links.

The term "repeater mode" or "repeater function" as used herein represents any function of retransmitting data synchronous to a recovered-clock. A "repeater" function does not require any elastic-buffers as there is no rate difference between incoming and outgoing data. The repeater function results in very low-latency as no elastic-buffers are required.

The term "retimer mode", or "retimer function", as used herein represents any function of retransmitting data with very low-jitter synchronous to a local-clock. A "retimer" function attenuates all jitter at the input and outputs data with extremely low-jitter. However, the retimer function results in very high-latency due to elastic-buffers.

The term "bypass mode", or "bypass function", as used herein represents a function of transmitting data along a very low latency path to retransmit data, but does not apply any jitter attenuation.

The term "disk bypass" as used herein represents the function of bypassing a certain disk, or disks, and still maintain a complete loop, to prevent a single disk failure from making a loop of interconnected disks non-operational. When a disk is bypassed, data travels along a "bypass path" in order to travel from one functioning disk to another functioning disk. With respect to a particular port, a disk bypass can be provided at an input and/or at an output of the port.

The terms "SERDES port" and "bypass port" will be used interchangeably herein to represent a high speed port on which bypass functions and other functions can be performed. The terms "SERDES device", "bypass device" and "port bypass circuit" will be used interchangeably herein to represent a device having high speed ports on which bypass functions and other functions can be performed.

Figure 3:
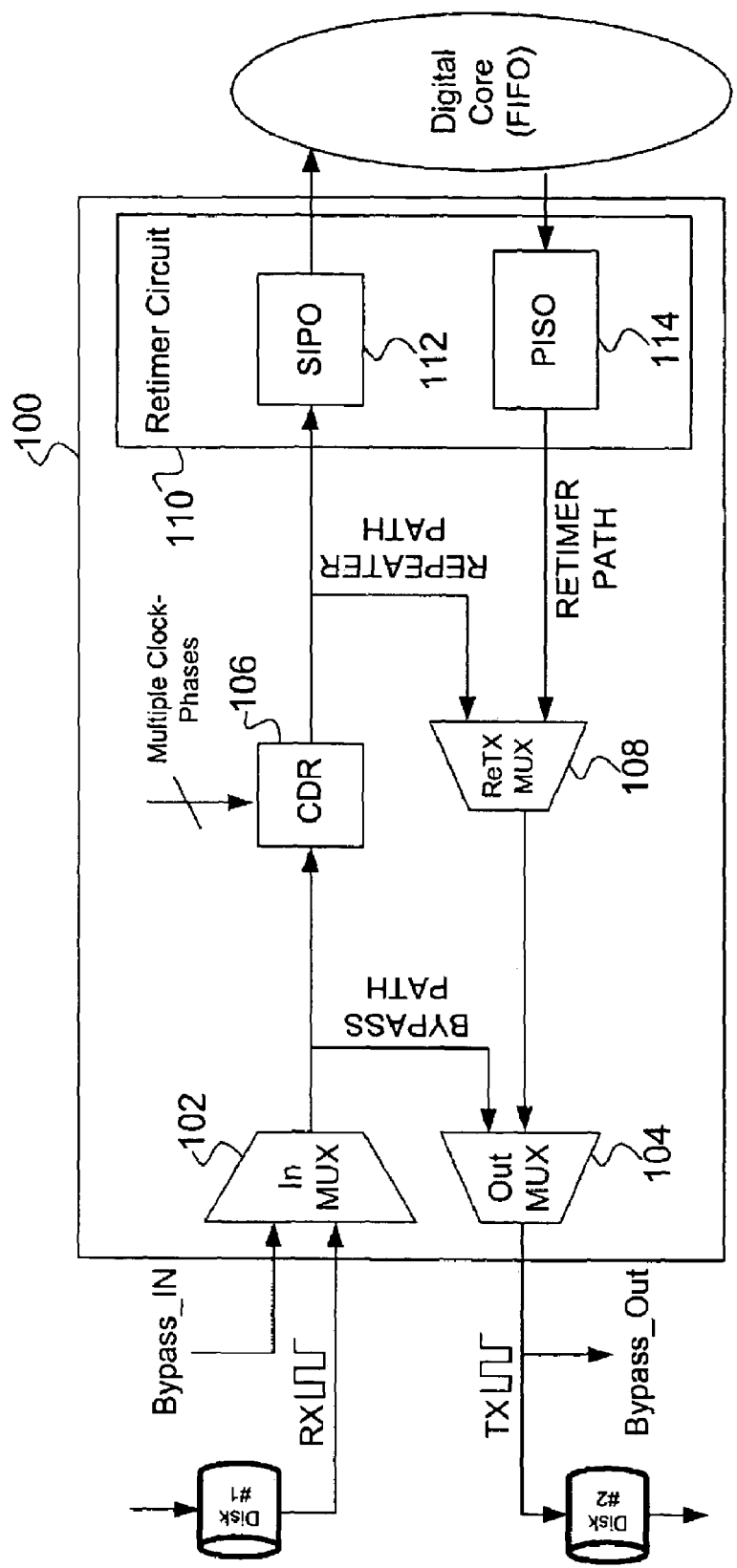
FIG. 3 is a bypass port supporting bypass, repeater, retimer modes according to an embodiment of the present invention.

FIG. 3 illustrates an architecture of a bypass port 100 that supports bypass, repeater and retimer modes according to an embodiment of the present invention. A first multiplexer, or input multiplexer, 102, along with a second multiplexer, or output multiplexer, 104, support the simple bypass function as described previously in relation to known systems. The bypass function provides a very low latency path to retransmit data but does not provide any jitter attenuation. The input and output multiplexers can alternatively be referred to as receive and transmit multiplexers, respectively.

The input multiplexer 102 is for receiving an input from a current port or a previous port. To this end, the input multiplexer 102 can include a current port input and a bypass input, and can also include a retransmit output and a bypass output. The current port input and the bypass input are indicated in FIG. 3 by RX and Bypass_IN, respectively.

As shown in the port of FIG. 3, CDR 106 is provided at each port. The clock and data recovery (CDR) unit 106 is for receiving a data stream from the input multiplexer, and for extracting a recovered clock from the data stream. To save area and reduce power this CDR 106 is preferably implemented as a digital clock-data-recovery circuit. A single PLL, e.g. a digital phase locked loop (PLL), generating multiple clock-phases can be shared across multiple ports to perform CDR function on each bypass port. Each CDR 106 can use either a "phase-picking" or "phase-interpolation" algorithm to perform clock-data recovery. The CDR unit can be coupled to the retransmit output of the input multiplexer.

The output of CDR 106 is a recovered-clock with the same frequency as the incoming clock, and with data that is synchronous to recovered-clock. Embodiments of the present invention can use source synchronous data and recovered-clock before de-serialization and send the data out again to implement repeater mode. A third multiplexer, or retransmit multiplexer, 108 can be used to implement either repeater mode or retimer mode, as will be described later. The retransmit multiplexer can alternatively be referred to as a repeater/retimer multiplexer. The retransmit multiplexer 108 can include a repeater input coupled to a repeater output of the CDR unit, and can also include a retimer input coupled to an output of the retimer circuit. It can be seen that depending on the path traveled by the data before entering the retransmit multiplexer 108, that multiplexer 108 can be used to implement either repeater mode or retimer mode.

Another advantage of this architecture is that incoming data can be de-serialized and transferred to local-clock domain using an elastic-buffer. Low-speed digital-logic can be used to process this data in local-clock domain. In retimer mode this data can be retimed to local-clock and retransmitted out. The retimer mode is implemented with a retimer circuit 110. The retimer circuit 110 is coupled to the CDR unit, preferably to a retimer output of the CDR unit, and is for communication with an elastic buffer for retiming data to a local clock. The elastic buffer need not be part of the retimer circuit itself, and can be included in a digital core (or FIFO), which includes one or more elastic buffers for performing the retiming. The retimer circuit is simply adapted to communicate with the elastic buffer(s). In an alternative embodiment, such as in cases where a frequency difference exists, the retimer circuit 110 can itself include an elastic buffer.

In a particular embodiment, the retimer circuit 110 includes two shift registers for facilitating communication with the elastic buffer(s). SIPO (serial in parallel out) 112 is a shift register into which data is received serially and read out in parallel. PISO (parallel in serial out) 114 is a shift register into which data is received in parallel and read out serially. The SIPO 112 is for providing information to the elastic buffer, and the PISO 114 is for receiving information from the elastic buffer. The SIPO 112 is for performing rate conversion, since a major reason for parallelizing data is to be able to operate at a lower rate. As part of the retimer mode, data passes through the retimer circuit 110 before passing through the third multiplexer, or retransmit multiplexer, 108. Retimer mode has the lowest jitter, but highest latency.

Although not shown in FIG. 3, the retimer circuit 110 can include digital logic for use in a monitoring mode. The digital logic can be implemented as part of the retimer circuit, or can be provided as a separate monitoring logic, in communication with the retimer circuit. This will be discussed later in relation to FIG. 16. For the time being, it is sufficient to note that the digital logic can be provided in the retimer circuit to facilitate communication with the digital core and the elastic buffer(s) therein. Digital logic can be used for monitoring to check integrity of the SERDES link and disk status. This information can be passed on to higher protocol layer for system diagnosis etc.

The retransmit multiplexer 108 is coupled to the CDR unit 106 and to the retimer circuit 110 for retransmitting data synchronous to the recovered clock in response to data received from the CDR unit, and for retransmitting data synchronous to the local clock in response to data received from the retimer circuit. The output multiplexer 104 is coupled to the input multiplexer 102 and to the retransmit multiplexer 108 for performing a bypass function in response to data received from the input multiplexer 102, and for outputting data in response to data received from the retransmit multiplexer 108. The output multiplexer 104 is for outputting data to either a current port or a subsequent port, as shown by the outputs TX and Bypass_Out, respectively in FIG. 3. The output multiplexer 104 can include a bypass input coupled to the bypass output of the input multiplexer, and can include a retransmit input coupled to an output of the retransmit multiplexer.

Embodiments of the present invention preferably use digital CDR to implement a repeater mode compared to conventional analog PLL based CDR used in known approaches. A repeater implemented this way improves jitter-transfer performance by attenuating jitter on incoming data and provides a very low latency in regeneration of incoming data. Repeater mode has moderate jitter and moderate latency.

Having CDR on each port also enables one to use a simple digital pre-distortion filter in the retransmit path to compensate for at least one of channel ISI and distortion. Once clock and data recovery is done, digital pre-distortion filter implementation is possible since one can establish a fixed amount of delay. In known conventional systems, such pre-distortion filter implementation could not be implemented accurately, partly due to limitations of analog PLL implementations of CDR. The pre-distortion filter can include a delay element, and a filter that adds a delay bit to a current bit with some sort of ratio.

Explaining embodiments of the present invention in another way, the present invention includes a port bypass method. The method includes the following steps: receiving an input data stream from a current port or a previous port; extracting a recovered clock from the data stream; retiming data to a local clock; retransmitting data synchronous to the recovered clock in response to a repeater condition; retransmitting data synchronous to the local clock in response to a retimer condition; performing a bypass function in response to a bypass condition; and outputting data in response to data received from the retransmit multiplexer; the outputting being to a current port or a subsequent port.

As shown in FIG. 3, all modes of bypass, repeater and retimer can be combined in a single bypass port to provide a multi-function port. Each port can operate in a mode that optimizes signal-integrity and latency per the link requirement. Each of the different functions, each involving different modes and paths, will be described below in further detail with reference to FIGS. 4-15.

Figure 4:
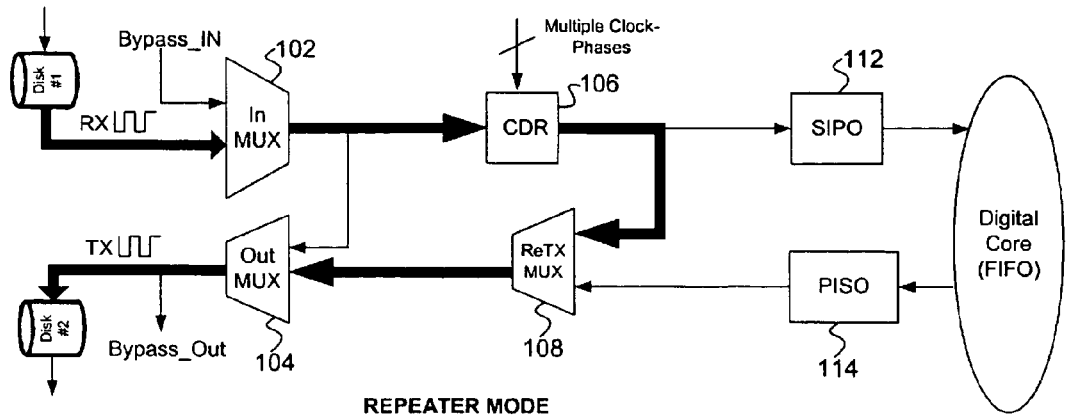
FIG. 4 is the bypass port of FIG. 3 showing data flow for a repeater mode function.

FIG. 4 is the bypass port of FIG. 3 showing data flow for a repeater mode function. For implementation of repeater mode, data enters the input multiplexer 102 from the Disk 1, or RX, input. Data then travels through the CDR 106, then through the retransmit multiplexer 108 and the output multiplexer 104, and exits to Disk 2 via the TX output.

Figure 5:
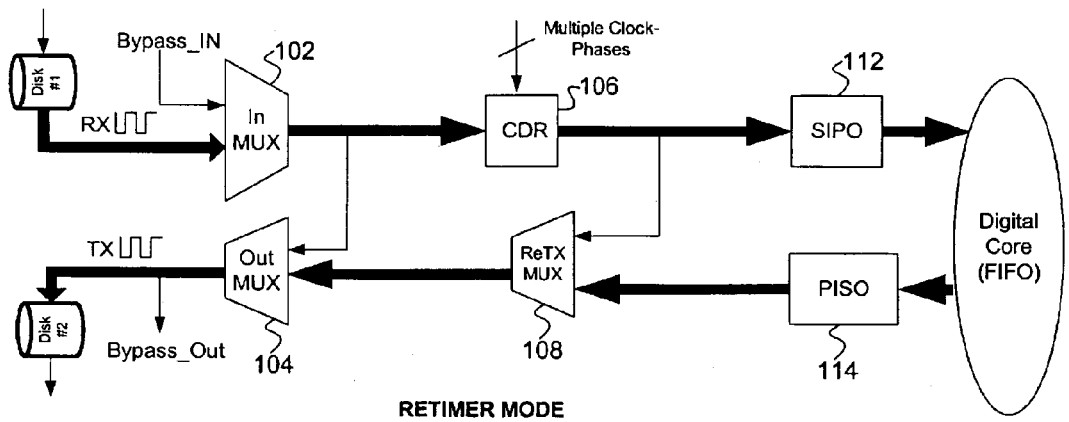
FIG. 5 is the bypass port of FIG. 3 showing data flow for a retimer mode function.

FIG. 5 is the bypass port of FIG. 3 showing, data flow for a retimer mode function. For implementation of retimer mode, data enters the input multiplexer 102 from the Disk 1, or RX, input. Data then travels through the CDR 106, and proceeds to the SIPO 112, through the digital core and the PISO 114. Data then continues through the retransmit multiplexer 108 and the output multiplexer 104, and exits to Disk 2 via the TX output.

Figure 6:
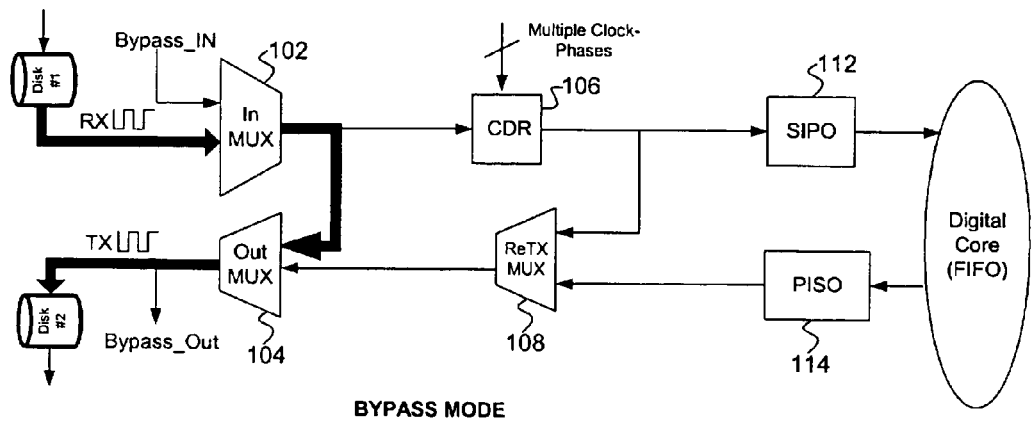
FIG. 6 is the bypass port of FIG. 3 showing data flow for a bypass mode function.

FIG. 6 is the bypass port of FIG. 3 showing data flow for a bypass mode function. For implementation of bypass mode, data enters the input multiplexer 102 from the Disk 1, or RX, input. Data then travels along the bypass path directly to the output multiplexer 104, and exits to Disk 2 via the TX output.

Figure 7:
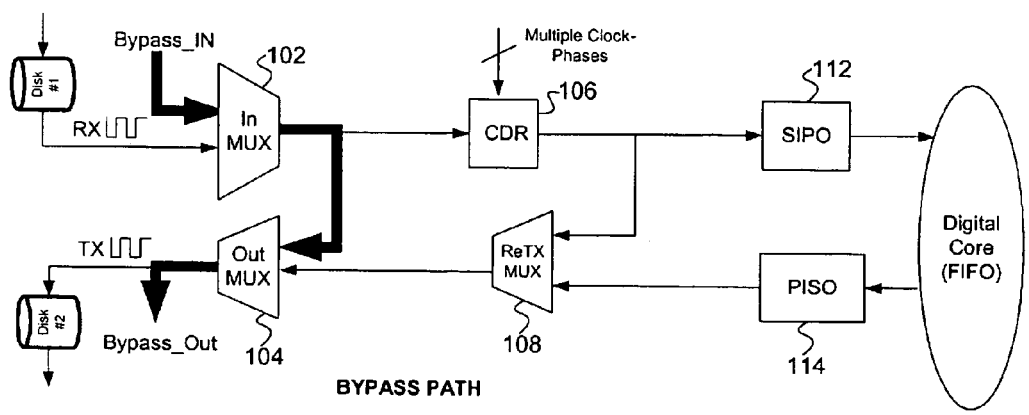
FIG. 7 is the bypass port of FIG. 3 showing data flow for a bypass path function.

FIG. 7 is the bypass port of FIG. 3 showing data flow for a bypass path function. For implementation of the bypass function, data enters the input multiplexer 102 from the Bypass_IN input. Data then travels along the bypass path directly to the output multiplexer 104, and exits to Disk 2 via the TX output.

Figure 8:
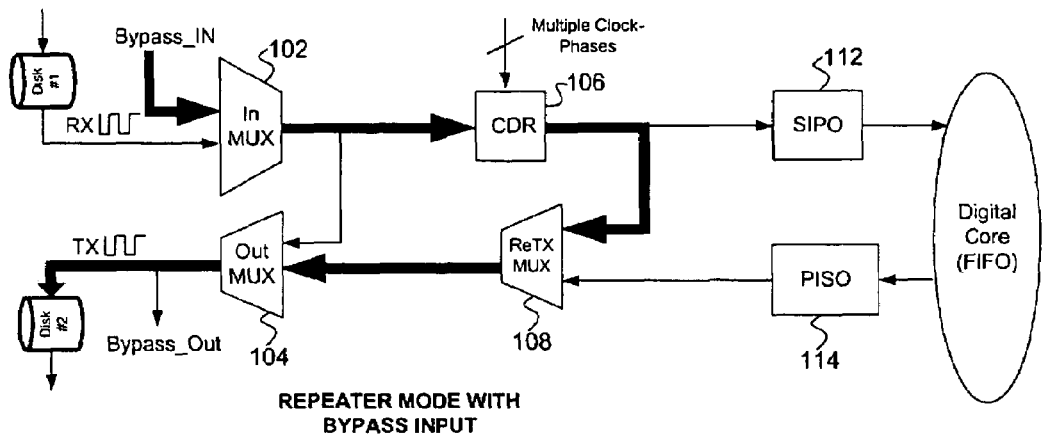
FIG. 8 is the bypass port of FIG. 3 showing data flow for a repeater mode with bypass input function.

FIG. 8 is the bypass port of FIG. 3 showing data flow for a repeater mode with bypass input function. For implementation of this function, data enters the input multiplexer 102 from the Bypass_IN input. Data then travels through the CDR 106, then through the retransmit multiplexer 108 and the output multiplexer 104, and exits to Disk 2 via the TX output.

Figure 9:
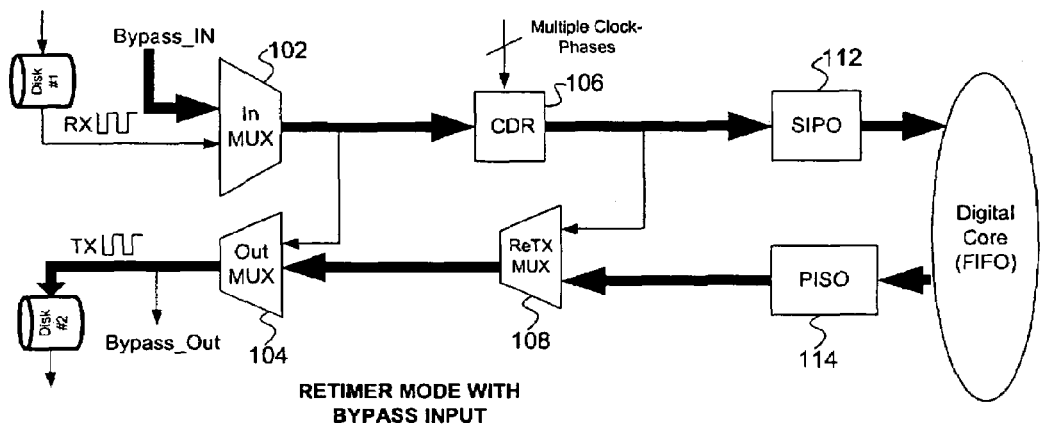
FIG. 9 is the bypass port of FIG. 3 showing data flow for a retimer mode with bypass input function.

FIG. 9 is the bypass port of FIG. 3 showing data flow for a retimer mode with bypass input function. For implementation of this function, data enters the input multiplexer 102 from the Bypass_IN input. Data then travels through the CDR 106, and proceeds to the SIPO 112, through the digital core and the PISO 114. Data then continues through the retransmit multiplexer 108 and the output multiplexer 104, and exits to Disk 2 via the TX output.

Figure 10:
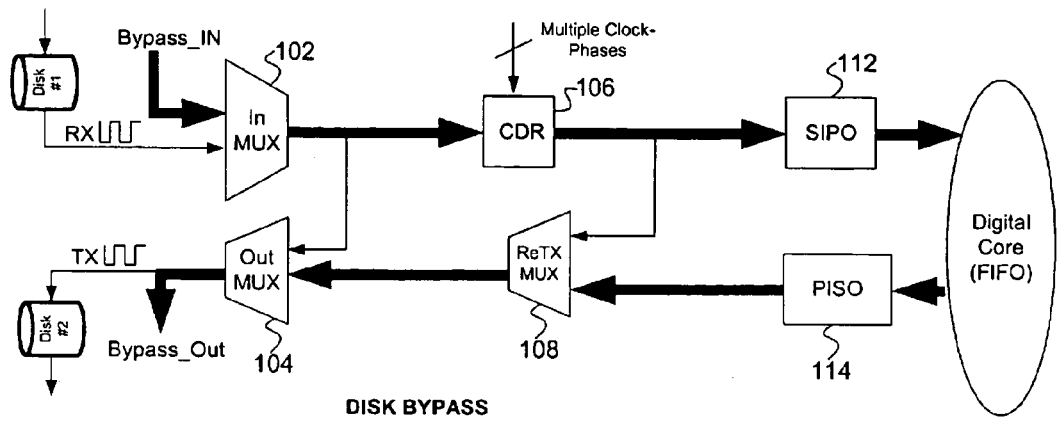
FIG. 10 is the bypass port of FIG. 3 showing data flow for a disk bypass function.

FIG. 10 is the bypass port of FIG. 3 showing data flow for a disk bypass function. For implementation of the disk bypass function, data enters the input multiplexer 102 from the Bypass_IN input. Data then travels through the CDR 106, and proceeds to the SIPO 112, the digital core 112 and the PISO 114. Data then continues through the retransmit multiplexer 108 and the output multiplexer 104, and exits via the Bypass_Out output.

Figure 11:
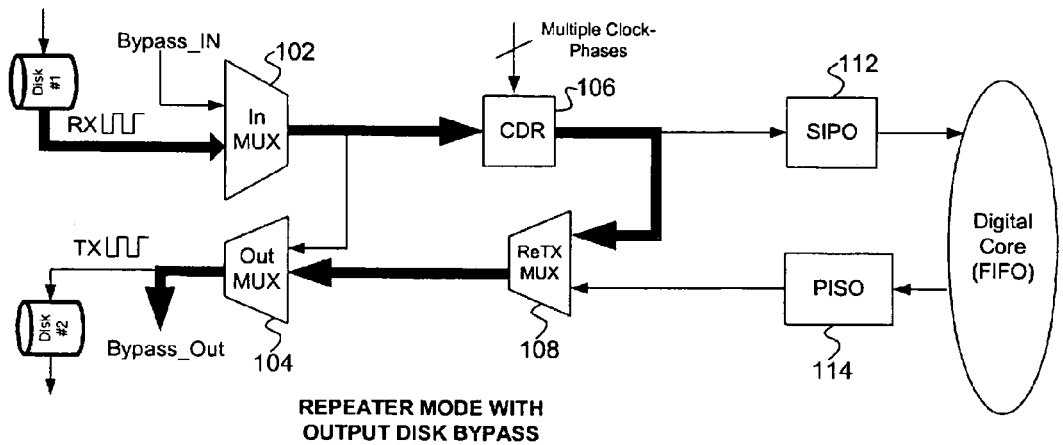
FIG. 11 is the bypass port of FIG. 3 showing data flow for a repeater mode with output disk bypass function.

FIG. 11 is the bypass port of FIG. 3 showing data flow for a repeater mode with output disk bypass function. For implementation of this function, data enters the input multiplexer 102 from the Disk 1, or RX, input. Data then travels through the CDR 106, then through the retransmit multiplexer 108 and the output multiplexer 104, and exits via the Bypass_Out output.

Figure 12:
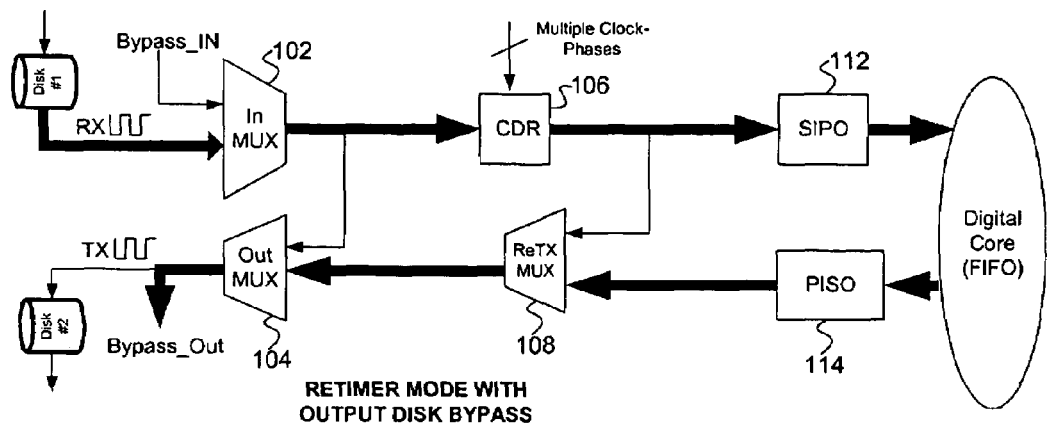
FIG. 12 is the bypass port of FIG. 3 showing data flow for a retimer mode with output disk bypass function.

FIG. 12 is the bypass port of FIG. 3 showing data flow for a retimer mode with output disk bypass function. For implementation of this function, data enters the input multiplexer 102 from the Disk 1, or RX, input. Data then travels through the CDR 106, and proceeds to the SIPO 112, to the digital core and the PISO 114. Data then continues through the retransmit multiplexer 108 and the output multiplexer 104, and exits via the Bypass_Out output.

Figure 13:
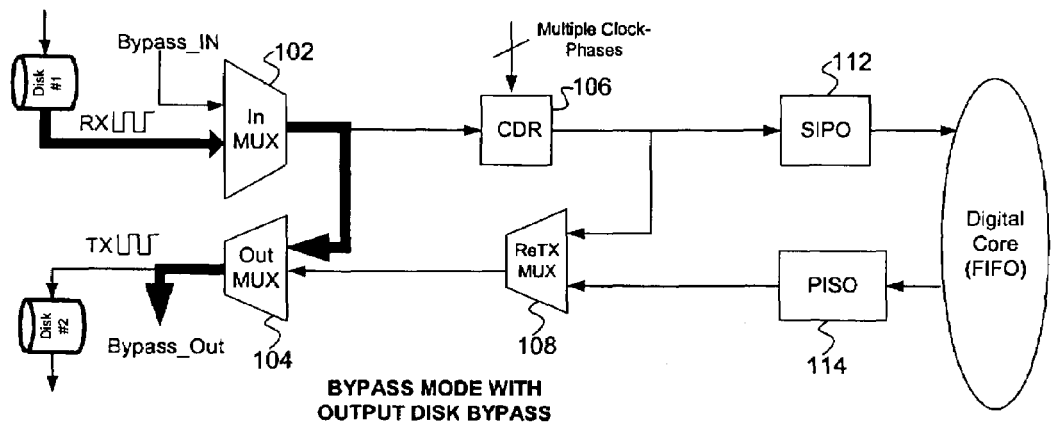
FIG. 13 is the bypass port of FIG. 3 showing data flow for a bypass mode with output disk bypass function.

FIG. 13 is the bypass port of FIG. 3 showing data flow for a bypass mode with output disk bypass function. For implementation of this function, data enters the input multiplexer 102 from the Disk 1, or RX, input. Data then travels along the bypass path directly to the output multiplexer 104, and exits via the Bypass_Out output.

Figure 14:
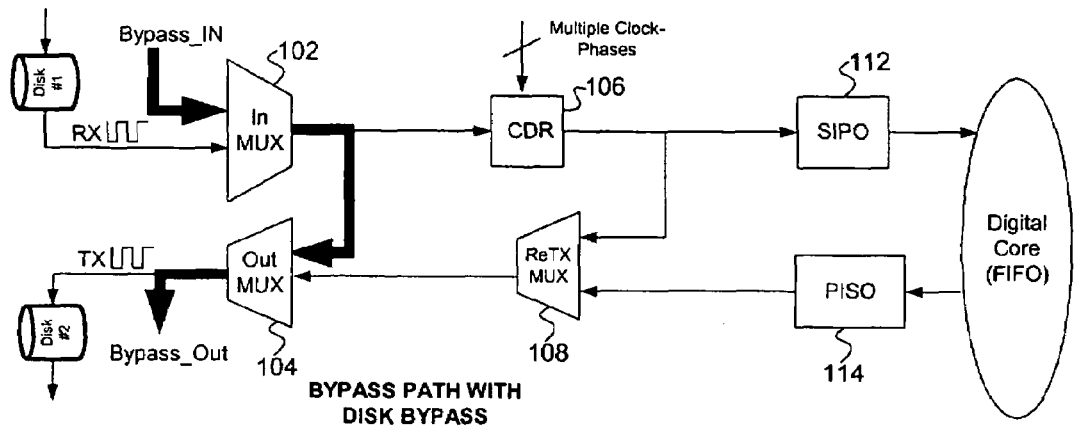
FIG. 14 is the bypass port of FIG. 3 showing data flow for a bypass path with disk bypass function.

FIG. 14 is the bypass port of FIG. 3 showing data flow for a bypass path with disk bypass function. For implementation of this function, data enters the input multiplexer 102 from the Bypass_IN input. Data then travels along the bypass path directly to the output multiplexer 104, and exits via the Bypass_Out output.

Figure 15:
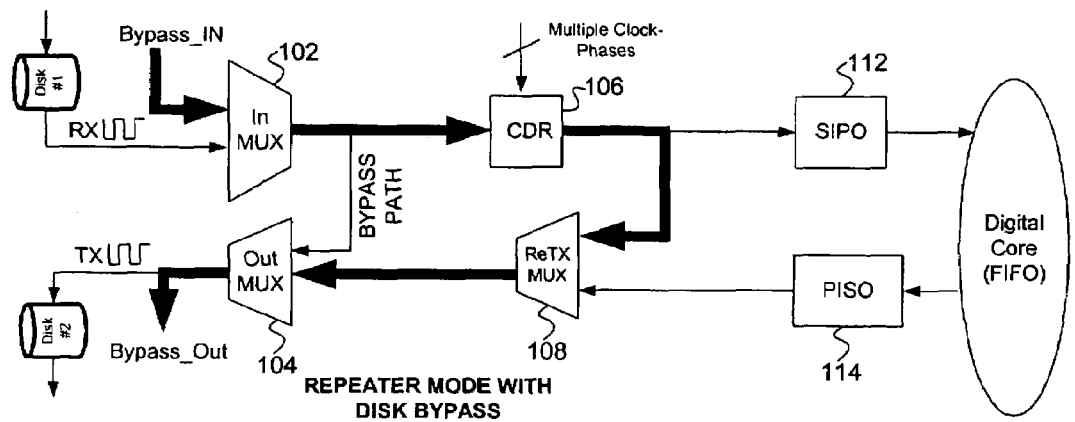
FIG. 15 is the bypass port of FIG. 3 showing data flow for a repeater mode with disk bypass function.

FIG. 15 is the bypass port of FIG. 3 showing data flow for a repeater mode with disk bypass function. For implementation of this function, data enters the input multiplexer 102 from the Bypass_IN input. Data then travels through the CDR 106, then through the retransmit multiplexer 108 and the output multiplexer 104, and exits via the Bypass_Out output.

Figure 16:
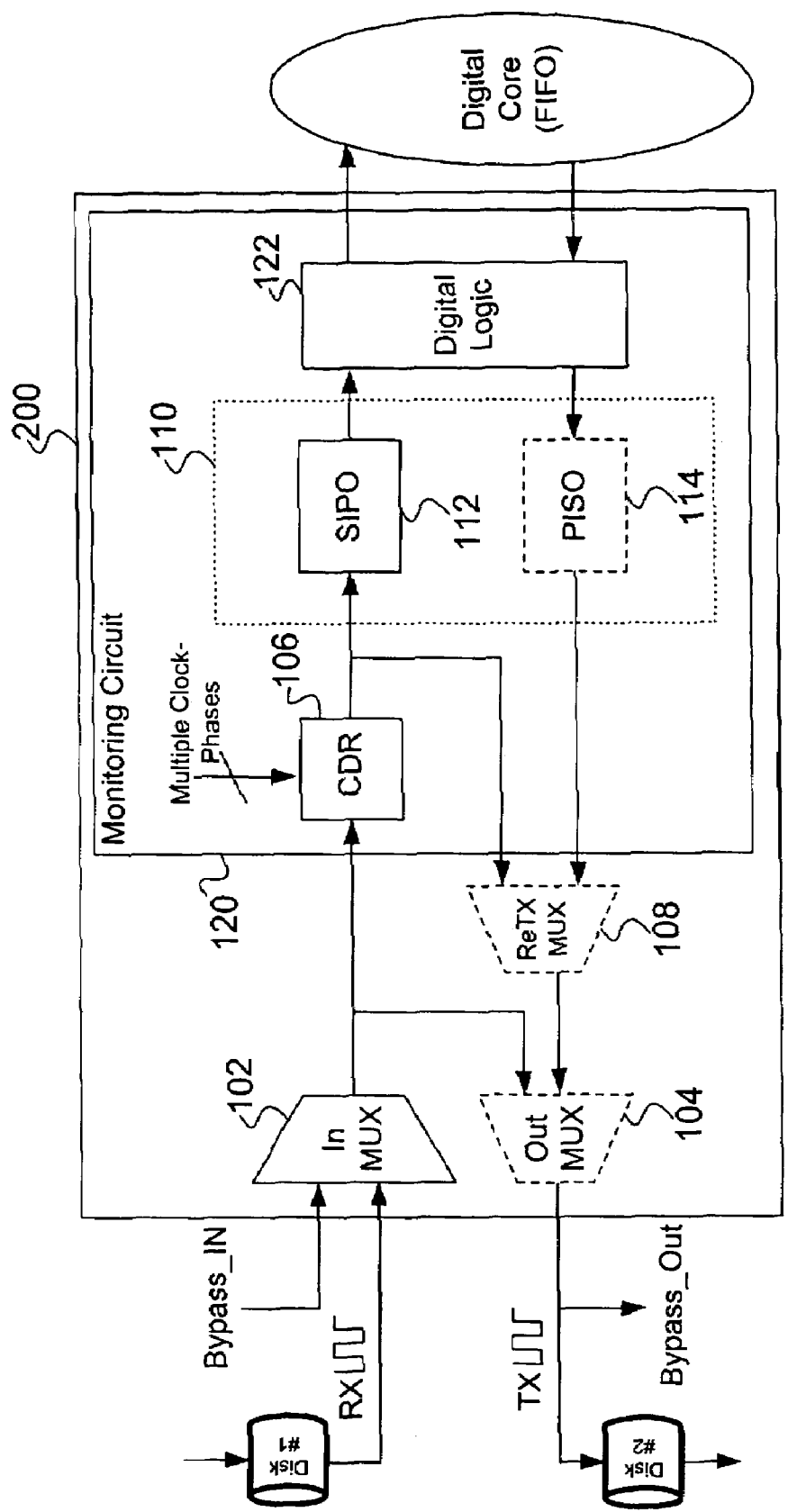
FIG. 16 is a bypass port supporting a monitoring mode according to an embodiment of the present invention.

FIG. 16 is a bypass port supporting a monitoring mode according to an embodiment of the present invention. The bypass port 200 of FIG. 16 is similar in many ways to the bypass port 100 of FIG. 3. However, not all of the same elements are needed to support a monitoring mode, particularly if monitoring is only performed on received data. The bypass port 200 includes input multiplexer 102 for receiving an input from a current port or a previous port. It also includes a monitoring circuit 120 for monitoring a bypassed disk, the monitoring circuit coupled to the input multiplexer 102. The monitoring circuit 120 can include a CDR unit 106, such as a digital CDR unit, and a SIPO 112 (both discussed with respect to other embodiments) and digital logic 122.

The clock and data recovery (CDR) circuit 106 is for receiving a data stream from the input multiplexer, and the serial in parallel out (SIPO) shift register 112 is coupled to the CDR unit 106. Similar to other embodiments of the present invention, a CDR unit is provided on a per-port basis, such that it would be provided on each port of a PBC incorporating ports according to embodiments of the present invention, in contrast with known approaches. With the digital CDR unit 106, the bypass port 200 can digitally monitor a bypassed disk, for example by monitoring recovered data relating to the bypassed disk, since the data itself is recovered from the serial bit stream. This is not possible in known systems where a simple analog mux is used, since the data itself is not recovered, but rather simply an observation is made that an error has occurred, e.g. a measured amplitude level is too high or too low. The digital logic 122 is for receiving data from the SIPO and for monitoring the data received. The digital logic 122 is generally provided to facilitate communication with the digital core and the elastic buffer(s) therein.

The digital logic 122 can be used for monitoring to check integrity of the SERDES link and disk status. This information can be passed on to a higher protocol layer for system diagnosis etc. via a control path, or a return path. At the higher protocol layer, a system controller can monitor status bits of ports, determine an error based on the monitored bits, and control the bypass port, or the port bypass circuit, based on the monitored error. The digital logic 122 can be implemented as part of the monitoring circuit as shown in FIG. 16, or can alternatively be provided as a separate monitoring logic, in communication with the monitoring circuit. The step of monitoring can include observing a data stream for key characters or patterns. Using the monitoring circuit 120, data of each bypassed disk can be monitored using CDR 106, SIPO 112 and digital logic 122.

In terms of the discussion of the control path, or return path, along which monitored data can be sent, there are different possibilities. The control path can be a second level control path, external to the bypass port, such as described above. If it is desirable to convey results of a step of monitoring Disk back to Disk 1, the control path may be a path at the same level (such a level can be, for example, a layer in the known OSI protocol stack). The path can, for example, go from the digital logic 122, through some sort of switch or multiplexer, back to the input of Disk 1. This would be useful, for example, in a situation where a disk has a programmable amplitude; in a monitoring mode, the monitoring circuit 120 can observe a high error rate and ask Disk 1 to increase its amplitude. These examples and control paths relate to situations wherein received data is monitored.

In some cases, it is desirable to be able to output monitored data to another disk. One of the ways of achieving such an output is over the retimer path as described earlier. In such an embodiment, the retransmit multiplexer 108 is provided similar to the previous embodiment, with the difference that it is coupled to the monitoring circuit 120 for retransmitting data from the monitoring circuit. The output multiplexer 104 is coupled to the input multiplexer 102 and to the monitoring circuit 120 for performing a bypass function in response to data received from the input multiplexer, and for outputting data in response to data received from the monitoring circuit, the output multiplexer for outputting data to a current port or a subsequent port.

In another embodiment, the monitoring circuit 120 further includes a parallel in serial out (PISO) shift register 114 for passing data from the digital logic 122 to an output of the output multiplexer 104. This can be advantageous if it is desirable to communicate the monitoring results on the transmit side of the port, such as to the disk on the transmit side of the port. In practical implementation, the PISO 114 can be included in the monitoring circuit 120, and only turned on or activated when needed.

Figure 17:
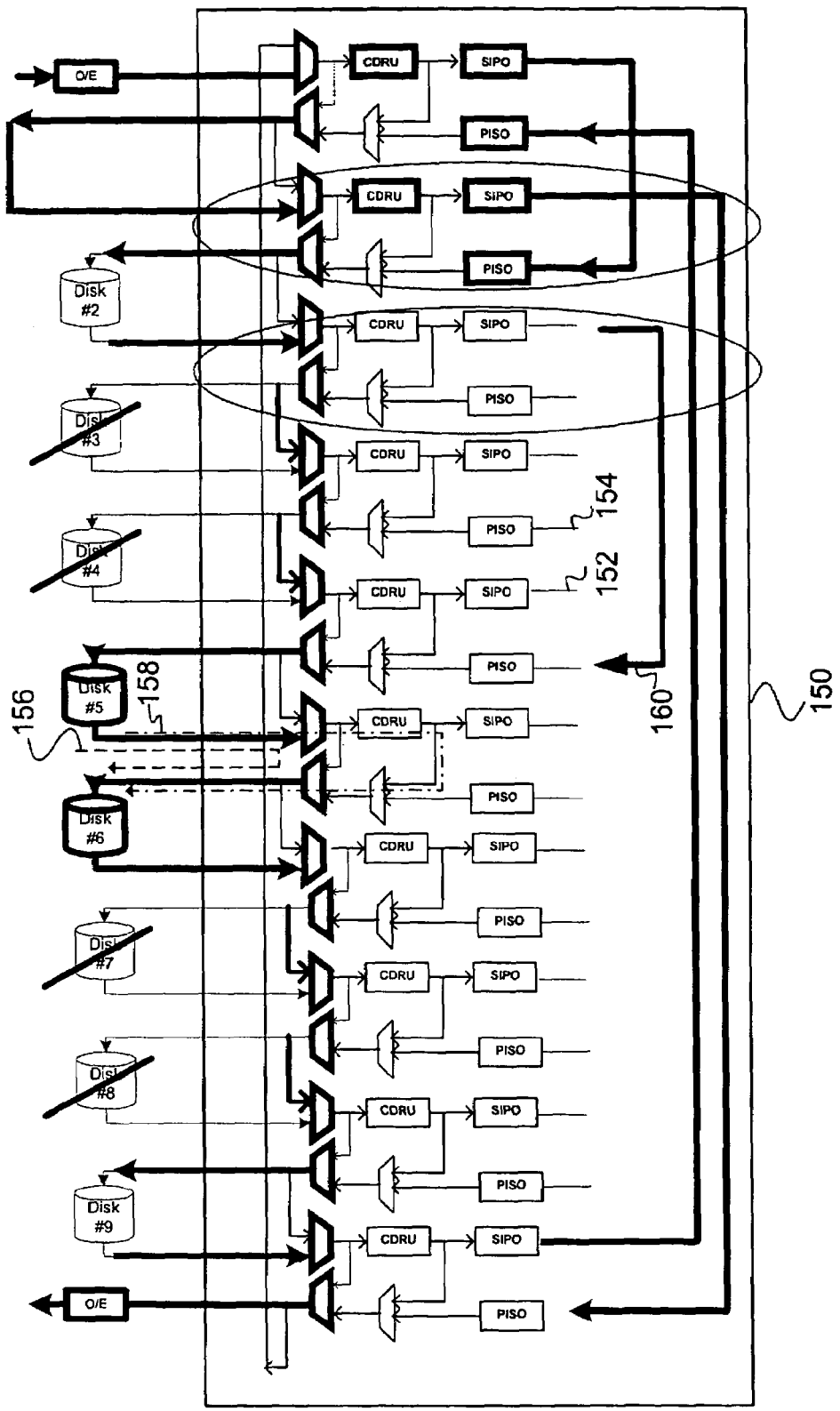
FIG. 17 is an example of an FCAL application using a bypass, repeater, retimer bypass port according to an embodiment of the present invention.

Shown in FIG. 17 is an example of FCAL application that uses bypass ports with bypass, repeater and retimer modes according to an embodiment of the present invention. The example shows a 10-port PBC device 150 with 1 expansion port, disks number 2, 5, 6, 9 connected and disks 3,4,7,8 bypassed. Bypassed Disk 4 can be monitored at the point identified as 152 and controlled from point 154. Disk 5 immediately following the monitored disk uses retimer-path to keep the FCAL loop active. If data from Disk 5 in bypass mode (identified by dashed line 156) has higher jitter that violates disk 6 input jitter-specification, then data from Disk 5 can use repeater path (identified by dashed and dotted line 158) for jitter-attenuation and transmission to Disk 6.

Describing the embodiment of FIG. 17 in another way. In a further aspect, a port bypass circuit is provided for connection to a plurality of disks, the port bypass circuit having a plurality of bypass ports. Each of the bypass ports includes: an input multiplexer for receiving an input from a current port input or a bypass input; a clock and data recovery (CDR) unit for receiving a data stream from the input multiplexer, and for extracting a recovered clock from the data stream; a retimer circuit coupled to the CDR unit for retiming data to a local clock; a retransmit multiplexer coupled to the CDR unit for retransmitting data synchronous to the recovered clock in response to data received from the CDR unit, and coupled to the retimer circuit for retransmitting data synchronous to the local clock in response to data received from the retimer circuit; and an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output. The plurality of bypass ports can include every port of the port bypass circuit. The plurality of bypass ports can be arranged to permit connection of the plurality of disks together in a simple loop topology.

While this embodiment of the architecture supports monitoring, it requires that the disk adjacent to the monitored disk always operate in retimer mode. In FIG. 17, with Disks 3 and 4 bypassed, data from Disk 2 can only be passed to Disk 5 in retimer mode as shown by path 160. This architecture can be enhanced as shown in another embodiment of the present invention to support repeater mode on the disk following the monitored disk.

Figure 18:
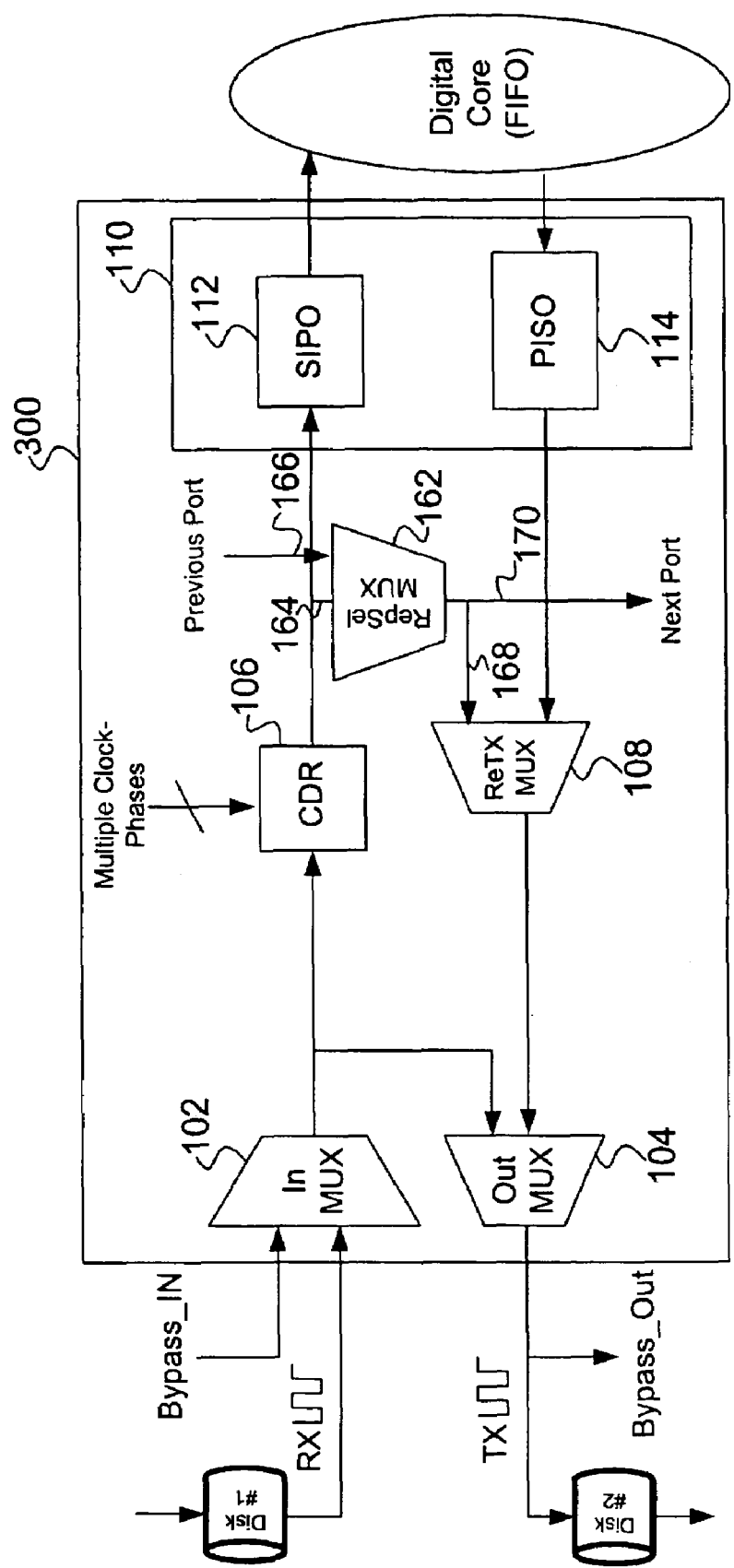
FIG. 18 is an enhanced bypass port supporting bypass, repeater, retimer modes according to another embodiment of the present invention.

Shown in FIG. 18 is an enhanced bypass port according to another embodiment of the present invention. The bypass port 300 provides capability to drive an active-disk following a "bypassed but monitored disk" in repeater-mode to reduce latency. An additional repeater select multiplexer 162, labelled "RepSel", is added in this embodiment. The repeater select multiplexer 162 preferably has two inputs and one output going to two different inputs, in order to be able to support repeater mode for the above-identified situations, also referred to herein as repeater-bypass mode.

The repeater select multiplexer 162 has a current port input 164 and a previous port input 166. These two inputs permit the multiplexer 162 to select the input data from either current port's CDR or data from previous port's CDR. When data from the current port's CDR is used, the current port input 164 is used. When data from the previous port's CDR is used, this data is received at the previous port input 166 of the repeater select multiplexer 162.

The repeater select multiplexer 162 has one output that is sent either to a port 168, which is coupled to an input of the current port, or to a port 170, which is coupled to an input of the next port. The two output options permit the multiplexer 162 to select the destination for its output data. When the output data is intended for the retransmit multiplexer 108, the output of the mux 162 is provided on the port 168, which is coupled to the current port to drive the retransmit multiplexer 108 from the current port. When the output data is intended for a repeater select multiplexer of the next port, the repeater select multiplexer 162 of the current port provides its output on the port 170, which is coupled to an input of the next port, which is further coupled to the RepSel mux of the next port.

Explaining the repeater select multiplexer 162 in another way, it can be provided in communication with a CDR unit of a previous port and coupled to the retransmit multiplexer, for performing a repeater function in response to data received from the CDR unit of the previous port and for outputting a result to the retransmit multiplexer. The repeater select multiplexer can also be provided such that it is coupled to the CDR unit and in communication with a retransmit multiplexer of a next port, for performing a repeater function in response to data received from the CDR unit and for outputting a result to the retransmit multiplexer of the next port.

All of the discussions regarding the regular repeater mode, retimer mode, bypass mode, bypass path and disk bypass as they relate to FIGS. 4-15 are similarly applicable to the embodiment shown in FIG. 18. As such, for the sake of brevity, the reader is referred back to those discussions. However, there are two additional data paths in the embodiment of FIG. 18 over the embodiment of FIG. 3, which will now be described.

Figure 19:
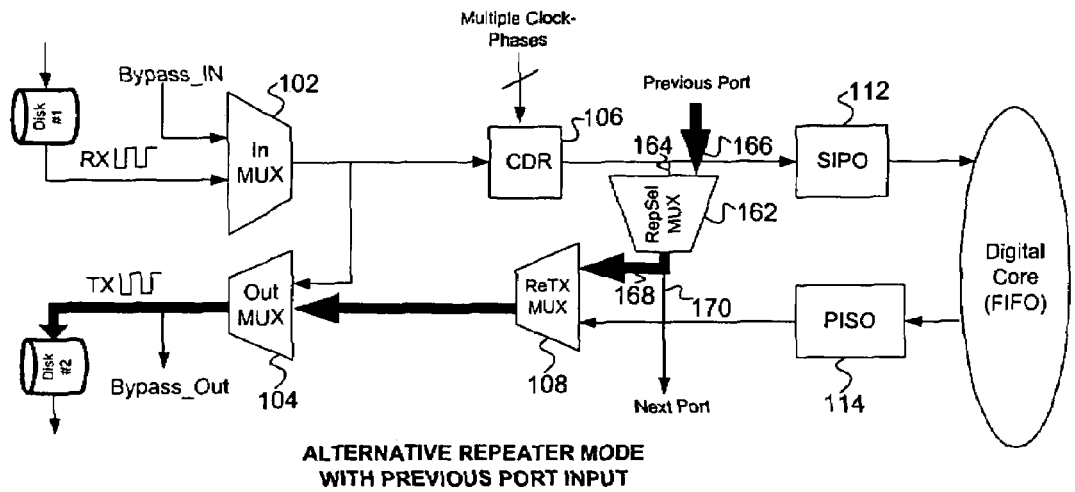
FIG. 19 is the enhanced bypass port of FIG. 18 showing data flow for an alternative repeater mode function using data input from a previous port's CDR and output to the current port.

FIG. 19 is the enhanced bypass port of FIG. 18 showing data flow for an alternative repeater mode function using data input from a previous port's CDR and output to the current port. For implementation of this repeater mode, data enters the repeater select multiplexer 162 from the previous port, for example from the previous port's CDR, at the input 166. Data then travels through the repeater select multiplexer 162, then via the port 168 through the retransmit multiplexer 108 and the output multiplexer 104, and exits to Disk 2 via the TX output. Of course, the data could alternatively be output on the Bypass_Out output if desired.

Figure 20:
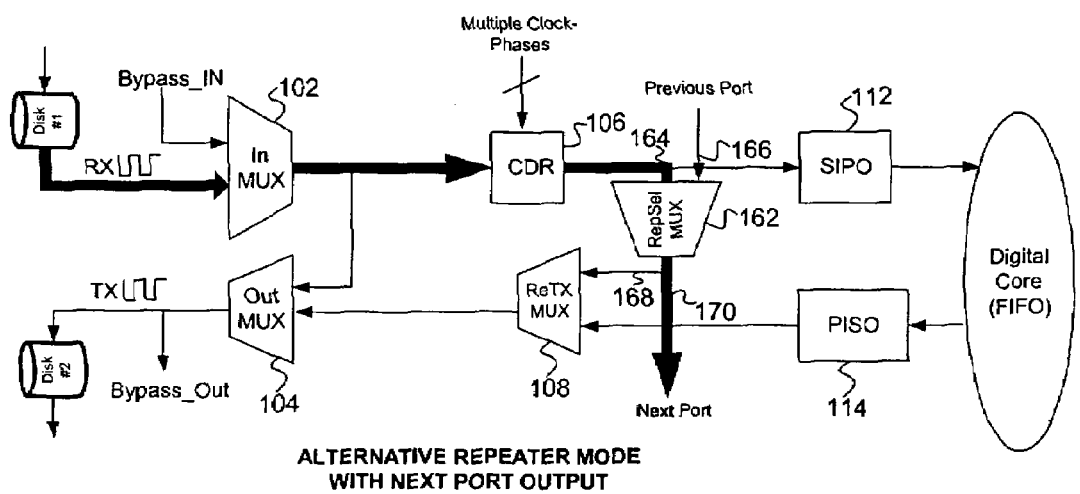
FIG. 20 is the enhanced bypass port of FIG. 18 showing data flow for an alternative repeater mode function using data input from the current port's CDR and output to the next port.

FIG. 20 is the enhanced bypass port of FIG. 18 showing data flow for an alternative repeater mode function using data input from the current port's CDR and output to the next port. For implementation of this repeater mode, data enters the input multiplexer 102 from the Disk 1, or RX, input. Of course, the data could alternatively enter via the Bypass_IN input. Data then travels through the CDR 106, then through the repeater select multiplexer 162. From the repeater select multiplexer 162, data is output on the output port 170 to the next port so that the repeater function can be provided to that port or to a subsequent port.

Figure 21:
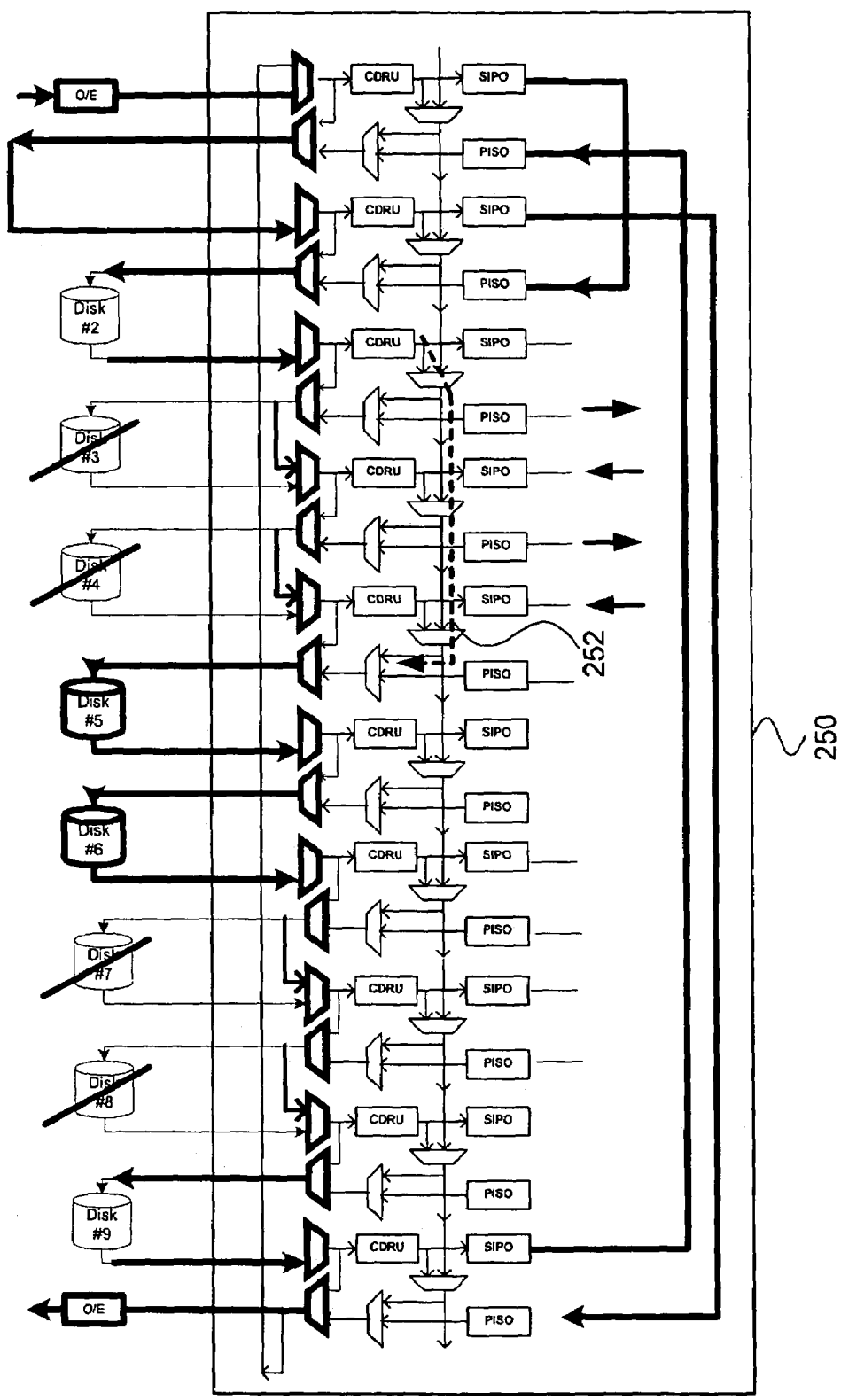
FIG. 21 is an example of an FCAL application using an enhanced bypass, repeater, retimer SERDES according to another embodiment of the present invention.

Shown in FIG. 21 is an example of an FCAL application that uses enhanced bypass ports to implement bypass, repeater and retimer modes. This implementation is very similar to that shown in FIG. 17. A 10-port PBC device 250 is provided, with each port being of the type illustrated in FIG. 18. The device 250 has 1 expansion port, and disks number 2, 5, 6, 9 are connected, while disks 3,4,7,8 are bypassed. In the device 250 of FIG. 21, bypassed disks 3 and 4 are both bypassed and monitored, as indicated by the arrows at the bottom of their ports. Disk 5 following bypassed Disks 3 and 4 can now be operated in a repeater mode using low-latency. This is achieved since data can follow the path 252 in FIG. 21, which is enabled by the repeater select multiplexer 162 in each of the ports, having inputs for the same and the previous port, and having outputs for the same and the next port. This allows Disk 4 to be monitored and Disk 5 to operate in bypass, repeating data from Disk 2 with low-latency. In this manner, a disk can be monitored and the adjacent disk following the bypassed disk, or downstream from the bypassed disk with respect to data flow, can be operated in repeater mode, or repeater-bypass mode. In other words, a bypass port according to an embodiment of the present invention can include a repeater select multiplexer for monitoring a bypassed disk and for operating a disk adjacent to the monitored bypassed disk in a repeater-bypass mode.

Explaining the embodiment of FIG. 21 in another way, the present invention provides a port bypass circuit for connection to a plurality of disks. The port bypass circuit includes a plurality of bypass ports, each of the bypass ports including an input multiplexer for receiving an input from a current port input or a bypass input. The port bypass circuit also includes a digital clock and data recovery (CDR) circuit shared across the plurality of bypass ports for receiving a data stream from the input multiplexer associated with each of the bypass ports and for extracting a recovered clock from the data stream. Each of the bypass ports further includes: a retimer circuit coupled to the digital CDR circuit for retiming data to a local clock; a retransmit multiplexer coupled to the digital CDR circuit for retransmitting data synchronous to the recovered clock in response to data received from the digital CDR circuit, and coupled to the retimer circuit for retransmitting data synchronous to a local clock in response to data received from the retimer circuit; and an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output. The digital CDR circuit can include a digital phase locked loop (PLL).

In summary, embodiments of the present invention provide a multi-port SERDES architecture, such as a bypass port or a port bypass circuit, with very low-power and area that can support bypass, repeater and retimer modes on each port. Such an architecture is advantageously used for Fibre-Channel Arbitrated Loop (FCAL) applications. Having all three modes on each port enables customers to make a trade-off between system-jitter budget, latency and performance. Having CDR on each port also enables one to use simple digital pre-distortion filters on the transmit path to compensate for channel losses. Performing pre-distortion on a transmit side is relatively easier since the transmitter has history data-pattern send. Some embodiments also provide capability to monitor data from a disk that is being bypassed, and others are flexible to support multiple FCAL loops with a single device.

In other words, embodiments of the present invention provide advantages, such as the following. A multi-function bypass port is provided. A multiport PBC, or SERDES architecture, is provided to support bypass, repeater and retimer modes on each port. Some embodiments use a single PLL that can be shared across multiple ports to implement digital clock-data recovery. "Recovered-clock" from a digital CDR unit is used in repeater mode to retransmit incoming data synchronous to "recovered clock". An architecture for FCAL loops is provided with a capability to monitor data from a bypassed port for fault-isolation or intelligent switching. The provision of CDR on each port enables use of simple digital pre-distortion to compensate for channel ISI/distortion. Embodiments of the present invention provide an architecture with the capability to support multiple FCAL loops with a single device. Furthermore, embodiments of the present invention provide an architecture to enable a single device that can be used as a simple "eye-opener" device or as a "trunk-extender" device where multiple ports are alignment and trunk together to create a higher-data rate link.

With respect to commercial significance and industrial applicability, Port Bypass Circuit (PBC) devices are used to implement FCAL systems for storage. Having good signal integrity and low-jitter are critical for these systems to work properly. As data-rates increase, signal integrity and jitter requirement become exceedingly difficult to meet. A simple bypass circuit will not be able to meet jitter requirements on the link from Disk to PBC device.

Disclosed techniques can be used to implement PBC devices at higher speeds which require retiming capability on every port to attenuate jitter and improve signal integrity. One of the disclosed techniques uses a digital clock-recovery method that can share a single-PLL across multiple ports. Also, three different modes bypass, repeater and retimer are combined in a single bypass port, or SERDES port, to provide flexibility of trading latency versus signal integrity in the system. Bypass port architecture as described herein facilitates integration of a large number of ports in a single PBC device due to smaller area and low power. Monitoring capability of this architecture can be leveraged to perform fault-isolation or intelligent switching based on data-content.

This architecture can be leveraged to create a single device that can be used in several different applications. For example, device with this SERDES architecture could be used in bypass mode where it provides signal amplification. Another application of this device would be use it as a "eye-opener" to provide reach-extension with low-latency when operated in repeater mode. Yet, another application of this device would be to provide "trunking" capability where traffic across multiple-ports is grouped together to provide a higher-rate aggregation function.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A bypass port comprising:
 an input multiplexer for receiving an input from a current port input or a bypass input; a clock and data recovery (CDR) unit for receiving a data stream from the input multiplexer, and for extracting a recovered clock from the data stream;
 a retimer circuit coupled to the CDR unit and for communication with an elastic buffer for retiming data to a local clock;
 a retransmit multiplexer coupled to the CDR unit for retransmitting data synchronous to the recovered clock in response to data received from the CDR unit, and coupled to the retimer circuit for retransmitting data synchronous to the local clock in response to data received from the retimer circuit; and
 an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output.

2. The bypass port of claim 1 further comprising a repeater select multiplexer for monitoring a bypassed disk and for operating a disk adjacent to the monitored bypassed disk in a repeater-bypass mode.

3. The bypass port of claim 2 wherein the repeater select multiplexer is in communication with a CDR unit of a previous port and coupled to the retransmit multiplexer, for performing a repeater function in response to data received from the CDR unit of the previous port and for outputting a result to the retransmit multiplexer.

4. The bypass port of claim 2 wherein the repeater select multiplexer is coupled to the CDR unit and in communication with a retransmit multiplexer of a next port, for performing a repeater function in response to data received from the CDR unit and for outputting a result to the retransmit multiplexer of the next port.

5. The bypass port of claim 1 further comprising a digital pre-distortion filter, in communication with the CDR unit and with the retimer multiplexer, for compensating for at least one of channel inter-symbol interference and distortion.

6. The bypass port of claim 1 wherein the CDR unit comprises a digital CDR circuit.

7. The bypass port of claim 1 wherein the CDR unit comprises a digital phase locked loop (PLL) shared across a plurality of bypass ports.

8. The bypass port of claim 1 wherein the CDR unit performs clock and data recovery based on a phase-picking algorithm.

9. The bypass port of claim 1 wherein the CDR unit performs clock and data recovery based on a phase-interpolation algorithm.

10. The bypass port of claim 1 wherein the retimer circuit includes a serial in parallel out (SIPO) shift register for providing information to the elastic buffer, and a parallel in serial out (PISO) shift register for receiving information from the elastic buffer.

11. The bypass port of claim 1 wherein the retimer circuit further comprises digital logic for use in a monitoring mode.

12. The bypass port of claim 10 wherein the retimer circuit further comprises digital logic for use in a monitoring mode.

13. The bypass port of claim 12 wherein the digital logic is for receiving data from the SIPO and for monitoring the data received.

14. The bypass port of claim 12 wherein the digital logic is for sending monitoring data to the PISO for further transmission to an output of the output multiplexer.

15. A bypass port comprising:
an input multiplexer for receiving an input from a current port input or a bypass input;
a monitoring circuit for monitoring a bypassed disk based on recovered data related to the bypass disk, the monitoring circuit coupled to the input multiplexer, the monitoring circuit including:
  a digital clock and data recovery (CDR) unit for receiving a data stream from the input multiplexer;
  a serial in parallel out (SIPO) shift register coupled to the CDR unit; and
  digital logic for receiving data from the SIPO and for monitoring the data received,
a retransmit multiplexer coupled to the monitoring circuit for retransmitting data received from the monitoring circuit; and
an output multiplexer coupled to the input multiplexer and to the monitoring circuit for performing a bypass function in response to data received from the input multiplexer, and for outputting data in response to data received from the monitoring circuit, the output multiplexer for outputting data to a current port output or a bypass output.

16. The bypass port of claim 15 wherein the monitoring circuit further includes a parallel in serial out (PISO) shift register for passing data from the digital logic to an output of the output multiplexer.

17. A port bypass circuit for connection to a plurality of disks, the port bypass circuit having a plurality of bypass ports, each of the bypass ports comprising:
an input multiplexer for receiving an input from a current port input or a bypass input; a clock and data recovery (CDR) unit for receiving a data stream from the input multiplexer, and for extracting a recovered clock from the data stream;
a retimer circuit coupled to the CDR unit for retiming data to a local clock;
a retransmit multiplexer coupled to the CDR unit for retransmitting data synchronous to the recovered clock in response to data received from the CDR unit, and coupled to the retimer circuit for retransmitting data synchronous to the local clock in response to data received from the retimer circuit; and
an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output.

18. The port bypass circuit of claim 17 wherein the plurality of bypass ports includes every port of the port bypass circuit.

19. The port bypass circuit of claim 17 wherein the plurality of bypass ports are arranged to permit connection of the plurality of disks together in a simple loop topology.

20. A port bypass circuit for connection to a plurality of disks, comprising:
a plurality of bypass ports, each of the bypass ports including an input multiplexer for receiving an input from a current port input or a bypass input; and
a digital clock and data recovery (CDR) circuit shared across the plurality of bypass ports for receiving a data stream from the input multiplexer associated with each of the bypass ports and for extracting a recovered clock from the data stream,
each of the bypass ports further including:
  a retimer circuit coupled to the digital CDR circuit for retiming data to a local clock;
  a retransmit multiplexer coupled to the digital CDR circuit for retransmitting data synchronous to the recovered clock in response to data received from the digital CDR circuit, and coupled to the retimer circuit for retransmitting data synchronous to a local clock in response to data received from the retimer circuit; and
  an output multiplexer coupled to the input multiplexer for performing a bypass function in response to data received from the input multiplexer, and coupled to the retransmit multiplexer for outputting data in response to data received from the retransmit multiplexer, the output multiplexer for outputting data to a current port output or a bypass output.

21. The port bypass circuit of claim 20 wherein the digital CDR circuit comprises a digital phase locked loop (PLL).

22. A port bypass method comprising:
receiving an input data stream from a current port or a previous port;
extracting a recovered clock from the data stream;
retiming data to a local clock;
retransmitting data synchronous to the recovered clock in response to a repeater condition;
retransmitting data synchronous to the local clock in response to a retimer condition;
performing a bypass function in response to a bypass condition; and
outputting data in response to data received from the retransmit multiplexer, the outputting being to a current port or a subsequent port.

* * * * *